US009994339B2

(12) United States Patent
Colson et al.

(10) Patent No.: US 9,994,339 B2
(45) Date of Patent: Jun. 12, 2018

(54) 3-D PRINTED PACKAGING

(71) Applicants: Shay C. Colson, Bellingham, WA (US); David S. Thompson, Spokane, WA (US); David A. Divine, Spokane, WA (US)

(72) Inventors: Shay C. Colson, Bellingham, WA (US); David S. Thompson, Spokane, WA (US); David A. Divine, Spokane, WA (US)

(*) Notice: Subject to any disclaimer, the term of this patent is extended or adjusted under 35 U.S.C. 154(b) by 206 days.

(21) Appl. No.: 15/173,637

(22) Filed: Jun. 4, 2016

(65) Prior Publication Data

US 2016/0280403 A1   Sep. 29, 2016

Related U.S. Application Data

(63) Continuation of application No. 14/992,005, filed on Jan. 10, 2016, which is a continuation of application
(Continued)

(51) Int. Cl.
*B29C 70/68* (2006.01)
*B65B 7/16* (2006.01)
(Continued)

(52) U.S. Cl.
CPC .............. *B65B 3/022* (2013.01); *A61J 1/03* (2013.01); *B29C 64/106* (2017.08);
(Continued)

(58) Field of Classification Search
CPC ..... B29C 64/10; B29C 64/106; B29C 64/112; B29C 64/171; B29C 64/176;
(Continued)

(56) References Cited

U.S. PATENT DOCUMENTS 6,363,606 B1   4/2002   Johnson et al.
6,471,993 B1   10/2002   Shastri et al.
(Continued)

OTHER PUBLICATIONS

A Machine Learning Approach for Product Matching and Categorization, Petar Ristoski et al., IOS Press, 2016, 17 pages.
(Continued)

*Primary Examiner* — Leo B Tentoni

(57) ABSTRACT

Items may be packaged for shipping or storage using additive manufacturing techniques, also known as three dimensional (3-D) printing. Packages made by such processes may be referred to as 3-D printed packages. A packaging system may include a 3-D printer and a computing device communicatively coupled to the 3-D printer. The computing device may obtain a packaging model describing a package for one or more items. A print module of the computing device may include instructions to print the package at least partially about the item(s) according to the packaging model. The configuration of a 3-D printed package may be based at least in part on one or more other packages. A 3-D printed package may include multiple separable compartments. A unit of 3-D printed packages may include multiple separable packages.

20 Claims, 6 Drawing Sheets

Related U.S. Application Data

No. 14/146,725, filed on Jan. 3, 2014, now Pat. No. 9,248,611.

(60) Provisional application No. 61/887,973, filed on Oct. 7, 2013.

(51) Int. Cl.

| | | |
|---|---|---|
| *B65D 1/24* | (2006.01) | |
| *B65D 1/30* | (2006.01) | |
| *B65B 3/02* | (2006.01) | |
| *B29C 67/00* | (2017.01) | |
| *B33Y 50/02* | (2015.01) | |
| *B29C 64/171* | (2017.01) | |
| *B29C 64/112* | (2017.01) | |
| *B29C 64/182* | (2017.01) | |
| *B65B 61/18* | (2006.01) | |
| *B65D 21/02* | (2006.01) | |
| *B29C 64/176* | (2017.01) | |
| *B29C 64/106* | (2017.01) | |
| *B65B 61/26* | (2006.01) | |
| *G05B 19/4099* | (2006.01) | |
| *B65D 65/38* | (2006.01) | |
| *B33Y 10/00* | (2015.01) | |
| *B33Y 80/00* | (2015.01) | |
| *A61J 1/03* | (2006.01) | |
| *B29C 70/70* | (2006.01) | |
| *B65B 61/00* | (2006.01) | |
| *B65D 75/52* | (2006.01) | |
| *B65B 61/02* | (2006.01) | |
| *B65B 63/00* | (2006.01) | |
| *B33Y 30/00* | (2015.01) | |
| *B29L 31/00* | (2006.01) | |
| *B29K 25/00* | (2006.01) | |
| *B29K 105/20* | (2006.01) | |
| *B29L 31/60* | (2006.01) | |

(52) U.S. Cl.
CPC .......... *B29C 64/112* (2017.08); *B29C 64/171* (2017.08); *B29C 64/176* (2017.08); *B29C 64/182* (2017.08); *B29C 67/0059* (2013.01); *B29C 67/0088* (2013.01); *B29C 70/688* (2013.01); *B29C 70/70* (2013.01); *B33Y 10/00* (2014.12); *B33Y 50/02* (2014.12); *B33Y 80/00* (2014.12); *B65B 61/007* (2013.01); *B65B 61/182* (2013.01); *B65B 61/26* (2013.01); *B65D 21/0206* (2013.01); *B65D 65/38* (2013.01); *B65D 75/527* (2013.01); *G05B 19/4099* (2013.01); *B29K 2025/06* (2013.01); *B29K 2105/20* (2013.01); *B29L 2031/608* (2013.01); *B29L 2031/712* (2013.01); *B33Y 30/00* (2014.12); *B65B 61/025* (2013.01); *B65B 63/005* (2013.01); *G05B 2219/35134* (2013.01); *G05B 2219/49007* (2013.01)

(58) Field of Classification Search
CPC ... B29C 64/182; B29C 64/386; B29C 64/393; B29C 70/68; B29C 70/688; B29C 70/70; B33Y 10/00; B33Y 50/00; B33Y 50/02; B65B 3/022; B65B 7/16; B65B 61/007; B65B 61/182; B65D 1/24; B65D 1/30; B65D 21/0206
USPC ...... 264/40.1, 259, 279, 279.1, 308; 53/452, 53/484
See application file for complete search history.

(56) References Cited

U.S. PATENT DOCUMENTS

| | | |
|---|---|---|
| 8,239,169 B2 | 8/2012 | Gregory et al. |
| 8,515,826 B2 | 8/2013 | Norman |
| 9,216,546 B2 | 12/2015 | DeSimone et al. |
| 9,248,611 B2 | 2/2016 | Divine et al. |
| 2002/0079601 A1 | 6/2002 | Russell et al. |
| 2004/0117273 A1 | 6/2004 | Henderson |
| 2004/0141018 A1* | 7/2004 | Silverbrook ............ B29C 70/68 347/4 |
| 2005/0256776 A1 | 11/2005 | Bayoumi et al. |
| 2014/0065194 A1 | 3/2014 | Yoo et al. |
| 2014/0088712 A1 | 3/2014 | Gage |
| 2014/0117473 A1 | 5/2014 | Kierse et al. |
| 2014/0213662 A1 | 7/2014 | Boris et al. |
| 2014/0313551 A1 | 10/2014 | Lyren et al. |
| 2014/0346081 A1 | 11/2014 | Sowden et al. |
| 2015/0052024 A1 | 2/2015 | Apsley et al. |
| 2015/0052025 A1 | 2/2015 | Apsley et al. |
| 2015/0096266 A1 | 4/2015 | Divine et al. |
| 2015/0099087 A1 | 4/2015 | Reznar et al. |
| 2015/0145158 A1 | 5/2015 | Xerox |
| 2015/0249043 A1 | 9/2015 | Elian et al. |
| 2016/0098730 A1 | 4/2016 | Feeney |
| 2016/0122043 A1 | 5/2016 | Divine et al. |
| 2016/0152358 A1 | 6/2016 | Divine et al. |
| 2016/0280403 A1 | 9/2016 | Colson et al. |
| 2017/0046806 A1 | 2/2017 | Haldenby et al. |
| 2017/0253354 A1 | 9/2017 | Colson et al. |
| 2017/0253401 A1 | 9/2017 | Bouthillier |
| 2017/0257358 A1 | 9/2017 | Ebrahimi et al. |

OTHER PUBLICATIONS

SAP and UPS work to attract partners to join Distributed Manufacturing early adopter program, Printer and 3D Printing News, http://www.3ders.org/articles/20160922-sap-and-ups-work-to-attract-partners-to-join-distributed-manufacturing-early-adopter-program.html, Sep. 22, 2016, 8 pages.
3D Hubs, Wikipedia, https://en.wikipedia.org/wiki/3D_Hubs, accessed on Feb. 3, 2018, 2 pages.
3D Hub, Your go-to service for ordering custom parts online, https://www.3dhubs.com/how-to-3d-print, accessed on Feb. 3, 2018, 2 pages.
Thingiverse features "Get This Printed" button to allow users to order 3D prints directly via 3D Hubs, Printer and 3D Printing News, http://www.3ders.org/articles/20150421-thingiverse-features-get-this-printed-button-order-3d-prints-directly-via-3d-hubs.html, 8 pages, (2015).
Notification of Transmittal of the International Search Report and Written Opinion of the International Searching or Authority, dated Jan. 18, 2018, from PCT/US17/54643, 17 pages.
3D Printing, Opportunities In Packaging, Get3DSmart, by John Hauer, available at least as early as Aug. 6, 2016, 69 pages.
Port of Rotterdam Launches Blockchain Lab, BTCMangager, by Joseph Young, Sep. 29, 2017, 6 pages.
Flexport's epic plan to build a freight empire with its $110M raise, TechCrunch, by Josh Constine, Oct. 6, 2017, 10 pages.
SenseAware, a FedEx innovation, accessible at http://www.senseaware.com/how-it-works/, available at least as early as Oct. 2, 2017, 5 pages.
FedEx Introduces SenseAware, the Next Generation Supply Chain Information Platform, accessible at http://about.van.fedex.com/newsroom/fedex-introduces-senseaware-the-next-generation-supply-chain-information-platform/, Nov. 17, 2009, 6 pages.
SenseAware is FedEx's IoT response to supply chain optimization, RCRWireless News, by Phillip Tracy, available at https://www.rcrwireless.com/20160929/big-data-analytics/fedex-iot-tag31, Sep. 29, 2016, 5 pages.
Digital Print Solutions for Smart Packaging, Xerox, available at https://www.xerox.com/en-us/digital-printing/packaging-solutions/smart?CMP=PPC-PSG&HBX_PK=Smart_Packaging

(56) References Cited

OTHER PUBLICATIONS

&HBX_OU=50&ADGRP=Packaging_-_Digital_Smart_Packaging_, available at least as early as Oct. 3, 2017, 5 pages.
Getting Smart with Digitally Printed Packaging, Xerox, available at https://www.xerox.com/en-us/digital-printing/packaging-solutions, available at least as early as Oct. 3, 2017, 6 pages.
Finding Blockchain-Based Security Solutions for the 3D Printing Economy, Bitcoin Magazine, by Giulio Prisco, available at http://www.nasdaq.com/article/finding-blockchain-based-security-solutions-for-the-3d-printing-economy-cm828884, Aug. 8, 2017, 3 pages.
Trusted Internet of Things and Smart Supply Chain Solutions, Chronicled, available at https://www.chronicled.com/, available at least as early as Aug. 9, 2017, 3 pages.
Blockchain and the future of retail, ETRetail.com, by Singaravelu Ekambaram and Lata Varghese, Aug. 22, 2017, 6 pages.
3D printed Smart Tags ensure 100% authenticity of collectible shoes, www.3ders.org, by Kira, Mar. 10, 2016, 12 pages.
Cubichain Stores Data of 3D Printed Aircraft Parts in Blockchain, 3D Printing, Aerospace 3D Printing, Business, By joseph Young, Dec. 7, 2016, 9 pages.
Voodoo Manufacturing, Small-Batch Manufacturing With High-Volume 3D Printing, Voodoo Manufacturing, Available at least as early as Sep. 10, 2017, 20 pages.
Pharma Giants Use Ethereum Network to Prevent Counterfeit Medicine, BTCManager, by Joseph Young, Sep. 25, 2017, 4 pages.
C3IOT, AI & IoT Software Platform for Digital Transformation, available at https://c3iot.com/, available at least as early as Aug. 18, 2017, 5 pages.
Smart sensors improve packaging machinery performance, Packaging Digest—Automation, by Mark Langridge, Apr. 15, 2015, 6 pages.
Smart Contracts: 12 Use Cases for Business & Beyond, Prepared by: Smart Contracts Alliance—In collaboration with Deloitte, available at http://bloq.com/assets/smart-contracts-white-paper.pdf, Dec. 2016, 56 pages.
Technology Innovation Profile: 3D Printing and Going Local, FedEx HealthCare Solutions, http://www.fedex.com/us/healthcare/knowledge-center/technology/technology-innovation-profile-3d-printing-and-going-local.html, available at least as early as Oct. 6, 2017, 3 pages.
3D Printing will make manufacturing local, Epson Insights, Jun. 12, 2017, 5 pages.
The race to connect smart contracts to the real world, American Banker, By Brian Patrick Eha, Aug. 7, 2017, 8 pages.
Adobe co-develops 3D printing software to improve structural designs, By Justin Rubio (accessed at http://www.theverge.com/users/Justin%20Rubio), Sep. 20, 2012, 3 pages.
Stava et al., Stress Relief: Improving Structural Strength of 3D Printable Objects, available at least as early as Oct. 1, 2013, 11 pages.
How 3D printing empowers packaging operations, By Lisa McTigue Pierce, Optimization (accessed at http://www.packagingdigest.com/optimization/how-3d-printing-empowers-packaging-operations141014), Oct. 15, 2014, 3 pages.
Packaging 3D Print—The Global Upheaval That's About to Occur, by John Hauer, 3DPrint.com (accessed at http://3dprint.com/80700/packaging-3d-print/), Jul. 12, 2015, 8 pages.
Office Action dated Nov. 23, 2015, in U.S. Appl. No. 14/146,725, the parent of the subject application, 12 pages.
Packaging 3D Print—The Global Upheaval That's About to Occur, By John Hauer (accessed at https://3dprint.com/80700/packaging-3d-print/), Jul. 12, 2015, 8 pages.

* cited by examiner

3-D PRINTED PACKAGING

RELATED APPLICATIONS

This application is a continuation of U.S. patent application Ser. No. 14/992,005, filed Jan. 10, 2016, which is a continuation of U.S. patent application Ser. No. 14/146,725, filed Jan. 3, 2014 (now U.S. Pat. No. 9,248,611), which claims the benefit of U.S. Provisional Application No. 61/887,973 (now expired), filed Oct. 7, 2013, all of which are incorporated herein by reference.

BACKGROUND

Products are commonly packaged by a manufacturer or distributor prior to sale. This sort of packaging is referred to as "retail packaging." Retail packaging varies widely depending on the products to be packaged, the size and the weight of the products, the durability or fragility of the products, where and how the products are to be sold, and numerous other factors. The retail packaging for a particular product is often designed specifically for the particular product. Considerable time and expense goes into designing retail packaging for a product. Due to the specialized nature of retail packaging, the retail packaging for one product is not likely to be suitable for another product. Thus, the cost of designing retail packaging for a product significantly increases the cost of making the product available for sale. Such upfront design costs may make retail packaging of some low volume or limited run products cost prohibitive.

Products and other items (collectively referred to as "items") may subsequently be packaged for storage and/or shipping. This sort of packaging is referred to as "non-retail packaging." Non-retail packaging typically employs general-purpose packaging supplies, such as cardboard boxes, bubble wrap, polystyrene peanuts, tissue paper, shrinkwrap, packing tape, and the like. Such general-purpose packaging supplies are readily available, but are not particularly suited for the specific items to be packaged. Consequently, items may be damaged during storage and/or transportation. Furthermore, the effectiveness of packaging is dependent largely on how the user chooses to package the item. Many users lack the skills or experience to effectively package items.

Accordingly, there remains a need for improved methods of retail and non-retail packaging.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This application describes using 3-D printing or other additive manufacturing techniques for retail packaging (i.e., packaging of a product prior to sale by a manufacturer, distributor, or the like) and/or non-retail packaging (e.g., packaging for storage, shipping, or the like). As used herein, the term non-retail packaging refers to any packaging for storage and/or shipping, whether performed before or after a sale to a consumer. That is, non-retail packaging includes shipping from a manufacturer to a customer, shipping from a manufacturer to distributor, shipping from a distributor to a customer, shipping from any image individual to another, and/or packaging item(s) for storage.

In some instances, the techniques described herein may be used to generate retail packaging for new products and/or existing products (e.g., repackaging of products with damaged or opened packaging, to refresh or update packaging, to package the product for a new or different market, to add additional or alternative packaging features, etc.). The techniques described herein may additionally or alternatively be used to generate non-retail packaging for products and other items (unpackaged items, items packaged using conventional retail packaging techniques, and/or items packaged using the retail packaging techniques described herein). In some instances, the techniques described herein may be usable to generate packages that serve as both retail packaging and non-retail packaging. Additionally, in some examples, the techniques described herein may be used in conjunction with 3-D printing of products themselves. For instance, after printing a product using 3-D printing techniques, a retail or non-retail package may then be printed for the product. The package may be printed as part of a same printing operation as the product itself, or as a separate printing operation in the same or different printing area.

While many of the examples are described as using 3-D printing and/or being implemented by a 3-D printer, the techniques described herein are also applicable to other forms of additive manufacturing. Unless specifically noted to the contrary, the terms "3-D printing" and "3-D printer" are used herein to mean additive manufacturing and additive manufacturing machines, respectively.

Example 3-D Printed Packaging System

Figure 1:
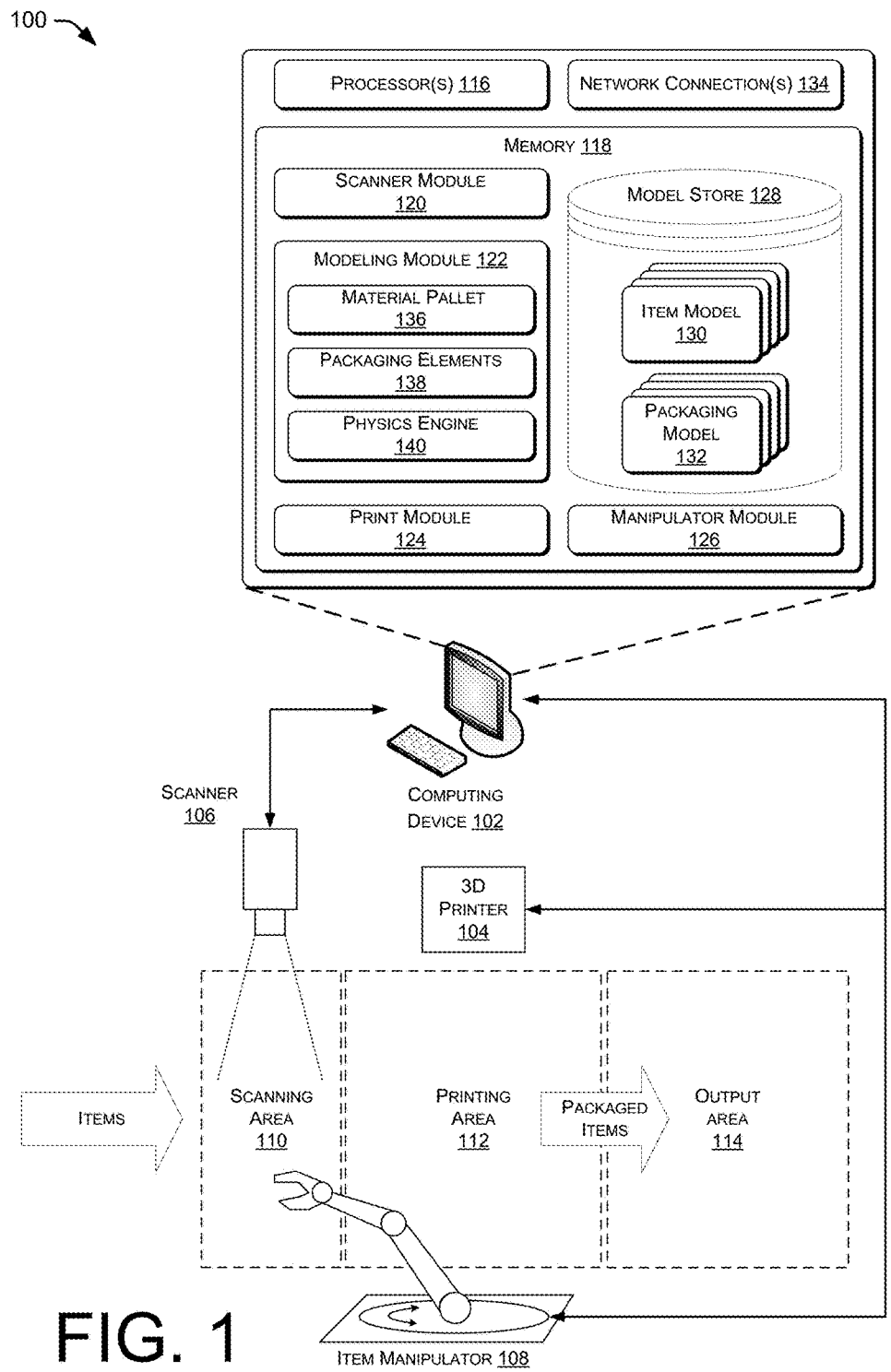
FIG. 1 is a schematic diagram of an example system usable to package items using 3-D printing.

FIG. 1 illustrates a system 100 usable to implement 3-D printed packaging of items. The system 100 may be used to provide retail packaging for products that are for sale to consumers. The system 100 may additionally or alternatively be used to provide non-retail packaging for other items. In the case of non-retail packaging, the items may or may not already include some packaging (e.g., retail packaging).

As shown in FIG. 1, system 100 includes a computing device 102 in communication with a 3-D printer 104. In the illustrated example, the system 100 also includes a scanner 106 and an item manipulator 108. However, in other examples, the scanner and/or manipulator may be omitted or combined with each other, the 3-D printer 104, and/or computing device 102. When present, the scanner 106 may comprise a 3-D optical scanner, a 3-D laser scanner, and/or one or more cameras to obtain information about an item, such as its visual appearance, outer dimensions, or the like. Numerous different scanners are available, such as, for example, the exaCT-S® CT Workstation or the Shapetracer Laser Line Scanner, both available from Wenzel America of Wixom, Mich., or the Artec Spikder, Artec L, or Artec EVA 3-D Scanners available from Artec Group of Palo Alto, Calif. In some examples, the scanner 106 may additionally or alternatively comprise an ultrasound scanner, an x-ray scanner, a spectrometer, a scale, and/or other scanning or sensing equipment to determine interior characteristics of the item, materials from which the item is made, weight of the item, volume of the item, density of the item, and the like.

In some examples, the computing device 104 may "recognize" the item based on the scan. The computing device 104 may recognize the item by, for example, reading a product identifier (e.g., universal product code or "UPC", model number, serial number, bar code, quick response code, or other identifier) of the item (if available), and then query a product catalog, model store, or other database to obtain additional information about the item. The computing device 102 may additionally or alternatively recognize the item using object recognition (e.g., by comparing the scan or a vector representation of the scan to a database of reference scans or images of items). Once an item is recognized, the computing device 104 may obtain additional information about the item such as a computer model of the item, a textual description of the item, product reviews of the item, human input information about the item, web pages related to the item, or any other available information about the item.

The item manipulator 108 may comprise a robotic arm or other computer controlled manipulator. In some examples, the item manipulator 108 may be specialized to move the item within the system 100. For instance, the item manipulator 108 may include specialized hardware (e.g., item engaging tools designed specifically for a particular type or shape of item) and/or software (e.g., customized code for a particular operation or set of operations). In that case the item manipulator 108 may be capable of limited and/or predetermined motions. However, in other examples the item manipulator 108 may comprise a robotic arm with a configurable or articulatable item-engaging tool or other manipulator having multiple degrees of freedom and capable of a wide range of motion. Numerous different manipulators are available depending on the specific tasks to be performed. In one specific example, a six-axis robotic arm, such as the Adapt Viper line of robotic arms available from Adept Technology, Inc. of Pleasanton, Calif. In some embodiments, the item manipulator 108 may additionally or alternatively comprise a conveyor belt, rollers, or other mechanisms to move items from one location and/or orientation to another.

The computing device 102, 3-D printer 104, scanner 106, and/or item manipulator 108 are in communication with one another over a wired and/or wireless network. The network of system 100 may be further connected to one or more other local and/or wide area networks, such as the Internet.

When an item is received, the item may be placed in a scanning area 110, where the item may be scanned by the scanner 106 to determine the nature of the item. Once the item has been scanned and the system 100 has determined the nature of the item to be packaged, the item may be moved to a printing area 112 where the item will be packaged. The item may be packaged alone or with one or more other items (e.g., other items that are part of a same order and/or are to be shipped to the same location). Once the item(s) are packaged, the packaged item(s) may be output to an output area 114 for storage, shipping, and/or further processing. The following description describes the process of packaging a single item. However, it should be understood that the process may also be used to print packaging for/around multiple items.

The computing device 102 comprises one or more processors 116 and memory 118. The processor(s) 116 may comprise one or more microprocessors (e.g., central processing units, graphics processing units, etc.), each having one or more processing cores, one or more microcontrollers, or the like. The memory 118 may be configured to store one or more software and/or firmware modules, which are executable by the processor(s) 116 to implement various functions. While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions. The memory 118 may comprise computer-readable media and/or devices and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media includes hardware and does not include modulated data signals or carrier waves.

Referring back to FIG. 1, the memory 118 includes a scanner module 120, a modeling module 122, a print module 124, and manipulator module 126, and a model store 128. The scanner module 120 may provide an interface (e.g., driver, application programming interface or "API," or the like) to the scanner 106. For instance the scanner module 120 may provide commands to control the scanner 106 to obtain information about the item. The scanner module 120 may additionally receive the output of scanner 106 (i.e., the scanned image(s) or sensor data captured by the scanner 106). From the output of the scanner 106, the scanner module is able to generate an item model 130 (if one did not already exist) or may select and/or supplement an existing item model 130 (if one already exists). Once generated, selected, and/or supplemented, the item model 130 may be stored in the model store 128 or other repository for subsequent access by local and/or remote computing devices.

The modeling module 122 generates a computer model of the packaging that is to be applied to the item. In other words, the modeling module 122 determines the geometry and layout of the package that should be used to package the item, taking into account the item model 130. The modeling module 122 generates a packaging model 132 describing the geometry layout of the package. The packaging model 132 may be stored in the model store 128. While the item models and packaging models are both shown as being stored in model store 128 in this example, in other examples the item models and packaging models may be stored separately in memory 118 or at one or more other data stores in communication with the computing device 102. The modeling module 122 may be a stand alone module, or may be a part of, an add-on to, or may otherwise integrate with, a 3-D modeling program such as SolidWorks available from Dassault Systèmes SolidWorks Corp. of Waltham, Mass., Pro-Engineer available from PTC of Needham, Mass., or the like.

Print module 124 may provide an interface (e.g., driver, application programming interface or "API," or the like) between the computing device 102 and the 3-D printer 104. For example, the print module 124 may include a printer driver and may provide commands controlling a print head of the 3-D printer. Print module 124 may control the 3-D printer 104 to generate packaging for the item according to packaging model 132. The print module 124 may control, among other things, the material or materials from which the package is to be printed, print speed of a print head of the 3-D printer 104, size and shape of packing material and/or an outer surface or shell of the package.

The manipulator module 126 may provide an interface (e.g., driver, application programming interface or "API," or the like) between the computing device 102 and the item manipulator 108. For example, the manipulator module 126 may be usable by the computing device 102 to direct the item manipulator 108 to move the item before, during and/or after printing the package. For instance, the manipulator module 126 may direct the item manipulator to place the item into the scanning area 110, to rotate or otherwise move the object in the scanning area 110, to move the object from the scanning area 110 into the printing area 112, to rotate or otherwise move the object in the printing area 112, and/or to remove the item from the printing area 112.

The computing device 102 also includes one or more network connections 134 to connect the computing device 102 to the other devices in the system 100, as well as to one or more other local and/or wide area networks. In some examples, the network connections 134 may allow a user, such as a purchaser of an item, to specify how the item is to be packaged for shipping to the purchaser or another intended recipient.

When the item is placed in the scanning area 110, the scanner 106 may scan the item. From the scan, the computing device 102 may obtain information to determine the nature of the item from one or more sources. For instance, as discussed above, the computing device 102 may recognize the item based on a product identifier or based on object recognition. If the computing device 102 recognizes the item, the computing device 104 may query one or more data sources to obtain additional information about the item. For instance, the computing device 102 may reference the model store 128 to determine whether or not a computer model of the item exists. If a computer model of the item exists, the computing device 102 may reference an item model 130 corresponding to the item to determine the geometry, materials, weight, volume, density, and/or other characteristics of the item. If a computer model of the item is not available, the computing device 102 may scan the item using scanner 106 to determine one or more characteristics of the item. In some instances the computing device 102 may have or be able to obtain (e.g., through external resources via the Internet) a complete item model 130 including exterior dimensions, interior dimensions, weight, volume, density, materials of construction, surface finish, and the like. In other instances, the computing device 102 may have a limited or partial item model 130, which describes less than all characteristics of the item. For instance a limited or partial item model might only include exterior dimensions of the item.

Based on item model 130 the item, modeling module 122 may construct or obtain (e.g., through external resources via a network such as the Internet) a packaging model 132 for the item. The modeling module 122 may include a material palette 136 defining the materials that are available from which to construct a package for the item. The modeling module 122 may further include one or more packaging elements 138, such as templates and previously stored design elements. For instance, packaging elements 138 may include computer models of ribs, flanges, honeycomb structures, bubble structures, trusses, or other design elements, features, or parts. The modeling module 122 may also include a physics engine 140 to model forces that are likely to be applied by and/or to the item during storage, shipping, and/or sale. In one example, the physics engine 140 may take into account characteristics of the item (e.g., size, shape, weight, fragility/durability, etc.) based on the item model 130, material properties (e.g., strength, elasticity, ductility, hardness, etc.) of the item and available packaging materials from the material pallet 136, forces to which the item may be exposed (e.g., gravity, inertia, impact, air resistance, etc.), and/or other factors (e.g., price, scarcity, shipping mode, storage location, intended use, etc.) obtained from item catalogs, product reviews, web sites, and/or other sources. In some instances, the physics engine 140 may obtain such information for an item at least in part from a product identifier of the item. The foregoing description is of just one example, and in other examples, the physics engine 140 and modeling module 122 may obtain information needed to perform their respective functions directly or indirectly from the enumerated sources, or from other available sources.

Based on the foregoing criteria, modeling module 122 may generate the packaging model 132 customized for the item to withstand the forces that are likely to be applied. For example, the physics engine 140 may determine that, based on a strength and weight of the item and a distance that the item is likely to be dropped during shipping, the packaging should be able to withstand a certain impact force. In another example, the physics engine 140 may determine that, based on the strength and weight item and a number of items that are commonly stacked on top of one another, the packaging should be able to support a certain static load. In some examples, the physics engine 140 may employ finite element analysis (FEA) or other mathematical techniques to model static and/or dynamic systems in which the item may be used/stored/shipped and/or the forces to which the item is likely to be exposed.

In other examples, instead of computing the forces to which the item is likely to be subjected, the physics engine 140 may categorize the item into one or more categories and may apply predetermined packaging rules, designs, or templates corresponding to the one or more categories. For instance, if the item has a density less than a certain threshold the physics engine 140 may categorize the item as being a "light weight" item. The physics engine 140 may further categorize the item as being a "fragile" item if, for example, it has relatively thin spans of material, is made of a brittle or low strength material, or is for other reasons susceptible to damage. The physics engine 140 may then identify (e.g., from a look up table or matrix) one or more packaging structures to use for the item based on the categorizations of "light weight" and "fragile." The physics engine may further modify or customize the packaging structures based on, for example, the size, weight, or other characteristics of the item. For instance, the physics engine 140 may determine a packing structure or combination of packing structures (e.g., bubble and web structures in this example) to use to package an item based on its categorization (e.g., "light weight" and "fragile"). The physics engine 140 may then adjust the number of packing structures (e.g., number of bubbles and/or webs, in this example), size of packaging structures (e.g., width, height, thickness, diameter, etc.), quantity of material used to generate the packing structures (e.g., mass or volume), the material from which the packing structures are constructed (e.g., hard plastic, elastomer, metal, etc.), and/or other characteristics of the packing structures (e.g., corner rounding, gussets, fillets, etc.) according to the characteristics of the item. In some embodiments, the physics engine 140 may additionally or alternatively take into account the value of the item, constraints on the cost of the package (e.g., what the customer is willing to pay), constraints on the size and/or weight of the package (e.g., due to postal or other delivery requirements), or other considerations.

Additional details of the packaging structures are described below in the section entitled "Example Packing Structures."

In some examples, before and/or after the item is placed in the printing area 112, the item may have a release applied so that the 3-D printed packaging does not stick to or damage the item. In one example, the computing device 102 may instruct the item manipulator to apply the release to the item, while in other examples the release may be applied to the item by another device or process prior to or after being placed in the printing area 112. In some examples, the release may comprise a chemical or material (e.g., corn starch, wax, paper, metal foil, etc.) applied to item to prevent the 3-D printed packaging material from adhering or bonding to the item. In other examples, the release may comprise a property imparted to the item (e.g., an electrostatic charge, a polished surface finish, a cold temperature, electromagnetic radiation, etc.) that helps to prevent the 3-D printed packaging material from adhering or bonding to the item. In still other examples, the release may be omitted (e.g., if the 3-D printed packaging material does not adhere to the material of the item, if a gap is maintained between the item and the 3-D printed packaging material during printing, and/or if it is desired that the 3-D printed packaging material adhere or bond to the item). In still other examples, a release may be applied to some parts of an item but not other parts, such as limited corners or edge points of the item to allow the package to adhere to, or form a weak bond with, the item (e.g., to secure the package to the item during shipping). In such an example, the limited corners or edge points that are not coated with the release may be sized and positioned such that the adhesion or weak bonds may be easily broken upon opening the package to separate the item from the package. The release may be applied before, during, or (in the case where part of the package is printed before the item is placed in the printing area) after the printing process commences.

Once the packaging model 132 has been generated and the item is otherwise ready for packaging (e.g., any desired release has been applied, any other items that are to be packaged with the item are present, etc.), the computing device 102 may initiate the printing process. In some examples, the item may be placed in the printing area 112 before printing commences and the package may be printed around the item. In other examples, at least a portion of a package may be printed before the item is placed in the printing area 112. For instance, the computing device 102 may instruct the 3-D printer 104 (e.g., via print module 124) to print a bottom or side surface and/or one or more support structures of a package prior to instructing the item manipulator 108 (e.g., via the manipulator module 126) to place the item into the printing area 112. The item manipulator 108 may then place the item into/onto the partially printed package (e.g., onto already printed support structures and/or into an already partially printed shell of a package), the computing device 102 may then cause the 3-D printer 104 to print the remainder of the package around the item.

In some examples, the package printed by the printing process may be one continuous part. In that case, the package may completely encapsulate the item or may cover only part of the item. In the case that the package encapsulates the item, the package may provide an air and/or water tight package. In some examples, the package may be hermetically sealed. Because the package is 3-D printed, the package may be seamless, minimizing chances that the package will catch on surfaces it comes into contact with and consequently minimizing the chances of damage to the package or the surfaces with which it comes into contact. The seamless surfaces of the package may also improve material handling capabilities. For instance, the seamless surfaces of the package may make the package easier to slide on conveyors, easier to pick up (e.g., with suction devices or grippers), easier to stack and load, etc. The seamless appearance may also provide a clean, aesthetically appealing appearance.

In other examples, the package maybe printed as multiple parts to facilitate opening or unpackaging the item. For instance, the package may comprise multiple parts that fit together like a 3-D puzzle and/or are held in place by one or more other parts. Additionally or alternatively, the package may include one or more opening features to help assist in the opening of the package. By way of example and not limitation, the package may include one or more thinned or frangible regions where the package is configured to separate during opening, one or more tabs or finger holds configured to be grasped by a user, or the like.

The package may additionally or alternatively include one or more of the following features:

thermal insulation (e.g., regions of material having a low coefficient of thermal conductivity such as wood, polystyrene, cellulose or glass fiber insulation, air or other gasses, and/or a vacuum) and/or electrical insulation (e.g., dielectric material);

vibration damping (e.g., regions of viscoelastic material such as rubber, silicone, synthetic polymers, wood, or composites including any of the foregoing);

crumple zones (e.g., features designed to fail before the rest of the package) to absorb energy of impacts;

child safety features (e.g., features requiring more strength, instruction reading ability, and/or dexterity to open than a typical child possesses);

tamper resistant and/or tamper evident features (e.g., features that will clearly show once the package has been opened or tampered with, such as for example, 2-D or 3-D water marks, frangible regions that will break if tampered with, materials or indicators that change color or otherwise indicate when they are exposed to air or humidity, ink or dye in the package that if punctured will discolor the package indicating the tampering);

desiccant material (e.g., received in pockets, pouches, or receptacles printed in the package and/or the package itself may be printed in whole or in part of a desiccant material);

all or part of the package may form an accessory for the item (e.g., a charging stand for an electronic device, a cover for an electronic device, a pill holder for medication, etc.); and/or the package may be made in whole or in part of a recyclable material (e.g., thermoplastic, glass, metal, ceramic, etc.), biodegradable material (e.g., cellulose based materials, sand with organic binder such as glycerin, etc.), and/or water soluble material (e.g., sucrose, glycerin, corn starch, gelatin, etc.) such that the entire package may be recycled and/or disposed of without any subsequent sorting or separating.

During or after 3-D printing the package structure, one or more pieces of information may be printed onto the package. The information may include, for example, shipping information (e.g., sender and/or recipient address), postage for the package, a packing list of the item(s) in the package, shipping instructions (e.g., "fragile", "this end up," etc.), opening instructions, set up or assembly instructions, "quick-start instructions," description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3-D relief code, or the like), a date on which the package was printed, a location at which the package was printed, an entity that printed the package, an identifier of the printer that printed the package, or any other pertinent information. The information may be printed in 2-D or 3-D by the 3-D printer 104 or by a 2-D printer located in or proximate the printing area 112.

Hybrid 3-D Printed/Conventional Packaging

In some examples, 3-D printed packaging may be combined with one or more conventional packaging techniques to result in one or more hybrid techniques. In one example, the package may comprise a preprinted or preformed container, such as a cardboard box. A 3-D printed package or portion of a 3-D printed package (e.g., packing material) may be placed in or printed and the preprinted or preformed container. For instance, in one simple example 3-D printed packing material may be printed around an item, the item enclosed in the packing material may then be placed inside the preformed container. Alternatively, the preformed container may be placed in the printing area 112, a portion of packing material may be printed within the container, and item may be placed in the container and the partially printed packing material, and a remaining portion of the packing material may be printed around the item within the container.

In another example, a conventionally packaged item may further have a 3-D printed package printed around the conventional package. For instance, an item may be packaged in conventional packing materials such as bubble wrap, tissue paper, or the like and/or may be placed in a conventional container such as a cardboard box. The conventionally wrapped item may then be placed into the printing area 112, and a 3-D printed package including a shell and/or packing material may be printed around the conventionally packaged item.

Example Packing Structures

As discussed above, structure of package may be based upon the fragility of the item, the weight of the item, the shipping distance, shipping mode, and/or the value of the item. For instance, fragile items may be packaged with a more protective structure of packing material than sturdy items. Heavy items may be packaged with a more robust structure of packing material than light weight items. The shipping distance, shipping mode, and value of the item may also be taken into account, with further distances and higher values resulting in more robust packing structures than shorter distances and lower values. Likewise, certain shipping modes (e.g., freight, bulk rate, etc.) may result in more robust packing than others (e.g., airmail, courier, drone, etc.). The robustness of a package may be adjusted by adjusting one or more of the type of support structure (e.g., lattice structure, a honeycomb structure, a truss structure, a bubble structure, one or more support ribs, web structure, loose particles or fibers, etc.), quantity of packing material (e.g., volume, mass, thickness, etc.), material used for packing material (e.g., plastic, rubber, silicone, silicon, glass, metal, stone, composites of any of the foregoing, etc.), and/or characteristics of the packing material (e.g., strength of material, hardness, toughness, elasticity, vibration damping ability, thermal insulating ability, etc.).

Multiple different packing materials and/or support structures may be used to package the item. For example, different support structures and/or crumple zones may be used in different portions of the package. For example, a relatively hard and/or rigid inner support structure may be formed immediately around (e.g., directly surrounding) the item, while a softer and/or more flexible material may be formed around the inner support structure, or vice versa.

Figure 2B:
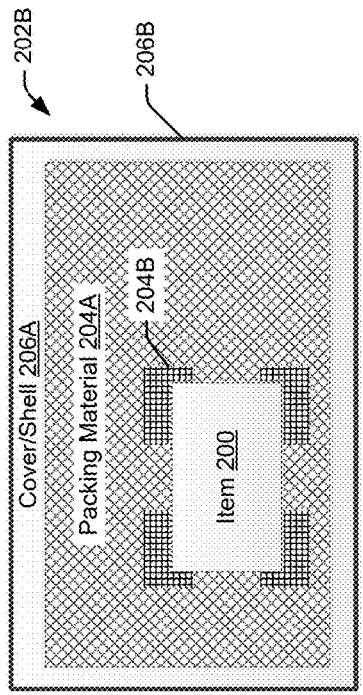
FIGS. 2A-2D are schematic diagrams illustrating example packaging techniques using 3-D printing.
Figure 2D:
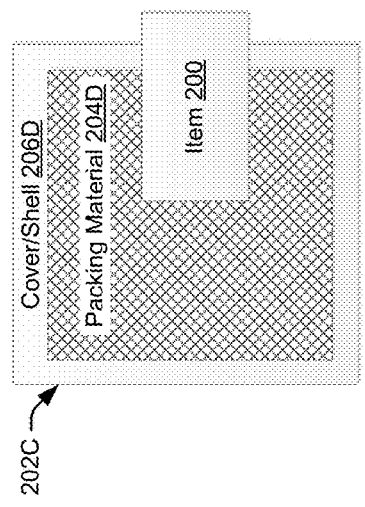
Figure 2A:
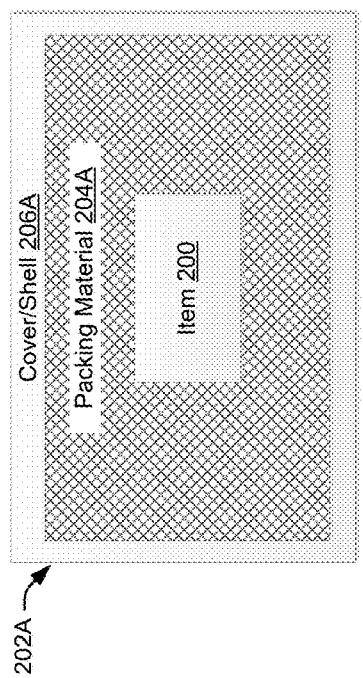
Figure 2C:
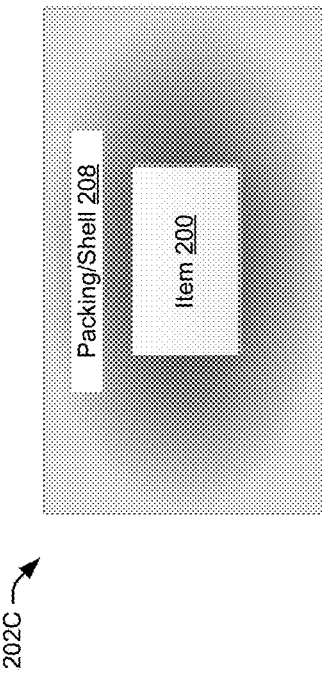
Figure 3A:
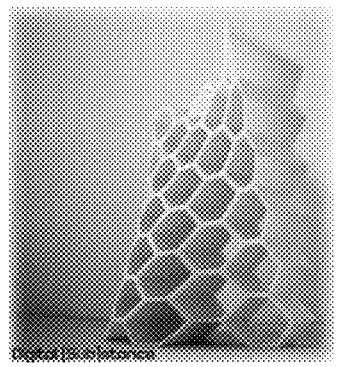
FIGS. 3A-3F illustrate example 3-D printed packaging structures that may be used to package items.
Figure 3B:
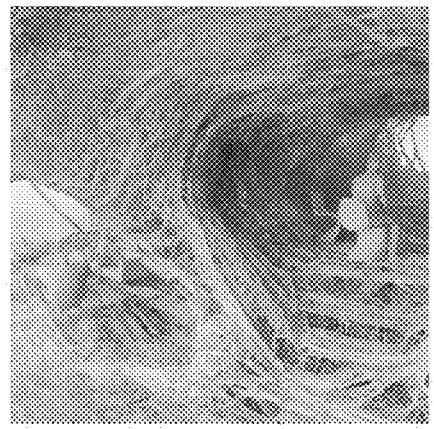
Figure 3C:
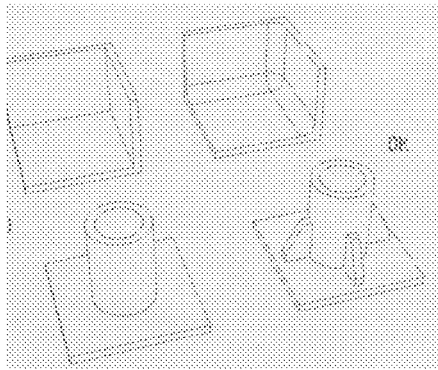
Figure 3D:
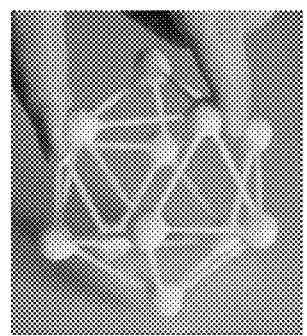
Figure 3E:
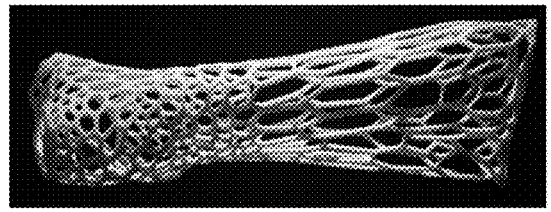
Figure 3F:
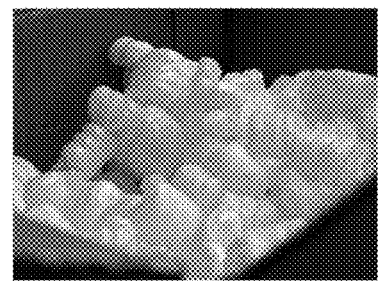
Figure 4A:
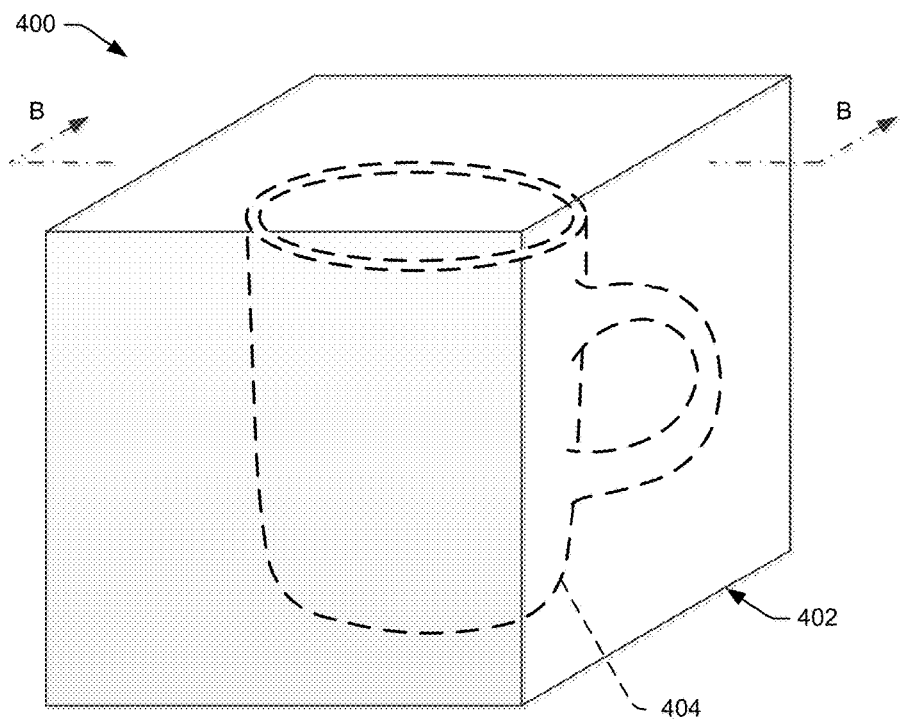
FIGS. 4A and 4B illustrate an example packaged item, packaged using 3-D printing.
Figure 4B:
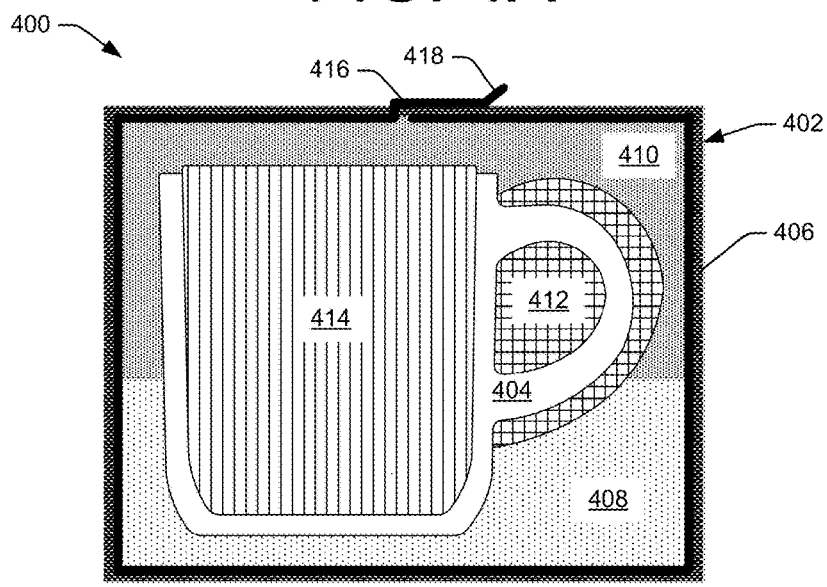

FIGS. 2A-2D illustrate example packaging techniques, FIGS. 3A-3F illustrate example packaging structures, and FIGS. 4A and 4B illustrate an example packaged item using packaging techniques and packaging structures such as those shown in FIGS. 2A-2D and FIGS. 3A-3F. However, numerous other packaging techniques and structures are possible within the scope of this disclosure by combining, rearranging, modifying, and/or omitting aspects of these and other examples described herein. The examples herein are merely examples for the purpose of illustration.

FIG. 2A illustrates an example in which an item 200 is packaged in a first example package 202A. The item 200 may represent any item that is to be packaged (retail packaging, non-retail packaging, or both). By way of example and not limitation, the item 200 may represent an item that is to be packaged for sale in a brick and mortar store, an item that is to be packaged for sale via an online merchant, an item to be placed in storage (e.g., long or short term storage), or an item that is to be shipped. Specific examples of items that may be packaged using these techniques are too numerous to list. A few arbitrary examples may include electronic devices, consumer products, medical devices, medication, food, etc.

The package 202A in this example completely surrounds or encapsulates the item 200, and includes packing material 204A that completely surrounds the item 200, and an outer cover or shell 206A disposed around an exterior of the packing material 204A. The packing material 204A may comprise a lattice structure, a honeycomb structure, a truss structure, a bubble structure, a web structure, one or more support ribs, loose particles or fibers, and/or other structures that may support the item 200 in the package 202A. Furthermore, the packing material 204A may comprise any of the materials described herein. The specific support structure(s) and/or material(s) used may depend on the desired strength, strength-to-weight ratio, density, rigidity, flexibility, vibration damping, impact absorption, thermal and/or electrical insulation, or other characteristics of the package 202A. In some examples, the size, material, and/or other characteristics of the package 202A may be based at least in part on a weight, durability, and/or cost of the item 200.

In the example of FIG. 2A, the packing material 204A is shown as being substantially homogenous throughout the package 202A. However, in other examples, the packing material may be heterogeneous (e.g., including multiple distinct areas of different support structures and/or different packing materials). Also, while the package 202A is shown as having only a single region of packing material 204A and a single shell 206A, in other examples packages may include multiple packing materials and/or regions of packing materials, and/or multiple outer covers or shells. In one specific example, a first portion of the packing material 204A (e.g., a region proximate to the item 200) may be printed of a desiccant material, such as silica, activated charcoal, calcium sulfate, calcium chloride, and molecular sieves, rice, or the like, while a second portion of the packing material 204A is made of a non-desiccant material. In other examples, the packing material 204A may be made entirely of desiccant material. In either of the foregoing examples, the second portion of the packing material 204A and/or the shell 206 may form a seal (e.g., hermetic seal) around the item 200 and the first portion of the packing material 204A comprising the desiccant material. Furthermore, in other examples, packages may omit either the packing material or the shell, or may employ a composite packing/shell, which may be homogenous or heterogeneous.

In some embodiments, a volume occupied by the packing material 204A may have a lower density than a volume occupied by the shell 206A. This may be accomplished by structural and/or material differences between the packing material 204A and the shell 206A. In some examples, this may be accomplished by making the packing material 204A porous and/or including voids, cavities, pouches, or "bubbles," while the making the shell 206A of a solid and/or non-porous material. In that case, the packing material 204A may be made of the same or different material than the shell 206A. The pores, voids, cavities, pouches, and/or bubbles may be filled with air or other gas, or may be substantially empty space (e.g., vacuums or partial vacuums). In some examples, a region defined by the packing material 204A may include about 30% to 70% by volume of air, gas, and/or substantially empty space. In other examples, the region defined by the packing material 204A may include 70% or more by volume of air, gas, and/or substantially empty space. Additionally or alternatively, this difference in density between the packing material 204A and the shell 206A may be accomplished by making the packing material 204A of a lower density material (e.g., plastic, polystyrene, etc.) than the shell 206A (e.g., metal, higher density plastic, etc.).

FIG. 2B illustrates another example in which the item 200 is packaged in a second example package 202B. In this example, the package 202B includes multiple regions of packing materials 204A and 204B and multiple shells 206A and 206B. Like the example of FIG. 2A, the package 202B completely encapsulates the item 200. However, in this example, the package 202B includes packing material 204A and additional or second packing material 204B. The additional packing material 204B in this example is localized at one or more limited locations around the item 200 and does not encapsulate the item. The additional packing material 204B may be located at locations of the item that may benefit from additional strength, impact absorption, or other protection. In the illustrated example, the additional packing material 204B is disposed at corners of the item 200. However, in other examples, the additional packing material 204B may be disposed at other locations relative to the item 200. The additional packing material 204B may have different construction (e.g., different structure) and/or be made of different material than the packing material 204A and/or the shells 206A and 206B. In one specific example, the additional packing material 204B may be made of a material (e.g., a viscoelastic material) and/or having a structure (e.g., an accordion or bubble structure) having greater damping ability than the packing material 204A (e.g., a truss, lattice, or honeycomb structure) to dampen vibrations and/or absorb impacts imparted to the package 202B and minimize their transmission to the item 200. Additionally or alternatively, in some examples, the additional packing material 204B may comprise a desiccant material to absorb moisture from within an interior of the package.

Also in this example, the package 202B includes an outer shell 206B disposed around shell 206A. The shells 206A and 206B may be made of the same or different material and may have the same or different structures. In one example, the outer shell 206B may be made of a harder or more rigid material than the shell 206A. Additionally or alternatively, the shell 206A may be made of a material that is more flexible, deformable, and/or has a greater damping ability than the outer shell 206B, thereby further isolating the item 200 from vibrations or impacts imparted to the exterior of the package 202B.

Also, in this embodiment, the item 200 is disposed in the package 202B off-center. The location of the item 200 within the package 202A may be chosen based on a center of gravity of the item, a relative durability of the different portions of the item, or the like. For instance, in the example of FIG. 2B, the item 200 may be disposed toward the bottom left of the package 202B based on the item 200 having a center of gravity located at the top right corner of the item 200, such that the center of gravity of the item 200 is located near a center of the package 202B. Additionally or alternatively, the item 200 may be disposed toward the bottom left of the package 202B based on the item 200 having a fragile region on the top right of the item 200, thereby providing a larger region of packing material between the fragile region of the item and the outside of the package 202B.

FIG. 2C illustrates an example package 202C in which the packing material and shell are formed integrally as a single packing shell 208. The packing shell 208 may comprise a uniform material throughout or, as shown in FIG. 2C, may be variable over its volume. In some examples, one or more material characteristics of the packing shell 208 may vary across one or more dimensions of the package 202C. For instance, the packing shell 208 may be printed with a higher density (in material and/or structure) proximate the item 200, with the density decreasing toward an exterior of the package 202C, or vice versa (i.e., low density near the item and higher density at the exterior of the package). The density of the packing shell 202 may change based on, for example, a distance from the item 200, or a relative distance between the item 200 and the exterior of the package 202C. The variability in material and/or material characteristics may smoothly transition at a uniform rate, may smoothly transition one or more variable rates, may transition in discrete steps, or a combination of the foregoing. Additionally or alternatively, the packaging structure of the packing shell 208 may change abruptly or smoothly transition, such as from an outer honeycomb configuration to an inner lattice work configuration.

FIG. 2D illustrates another example package 202D in which the package 202D covers less than the entire item 200. In this example, the item 200 protrudes at least partially from the package 202D. This example may be used where, for example, the item 200 has a base or stand to support the item 200 during use. In that case, once delivered, the package 202D may be placed with the base of the item resting on the ground or other support surface and the package 202D may be removed from the item 200 without having to lift the item from the package 202D.

FIGS. 3A-3F illustrate examples of several structures that may be used for packing materials, shells, and/or other portions of packages according to this application. However, packages according to this disclosure are not limited to these example structures. The structures may be printed from any one or more of the materials described herein or other materials.

FIG. 3A illustrates an example honeycomb structure that may be used to package items. The size, shape, wall thickness, and other characteristics of the honeycomb structure may vary depending on the item to be packaged and the requirements and constraints on the package. Such a honeycomb structure is an example that may provide a relatively high rigidity in at least one dimension with relatively high strength-to-weight ratio.

FIG. 3B illustrates an example web structure comprising multiple relatively fine fibers or strands that connect to each other, other portions of a package, and/or an item to be packaged.

FIG. 3C illustrates example structures in which one or more support ribs, flanges, or gussets are disposed between one or more portions of a package (e.g., between top, bottom, sides of the package, internal features, and/or other support structures of the package) and/or the item. The rib structures may be employed to increase one or more radiuses, add structural supports at weak locations, and/or remove stress risers in the package.

FIG. 3D illustrates an example lattice structure in which elongated bars, rods or other supports are arranged to form trusses. The bars, rods or supports may be disposed, for example, between (i) one or more portions of a package (e.g., top, bottom, sides, internal features, and/or support structures of the package), (ii) one or more nodes or connection points of the lattice structure, and/or (iii) the item.

FIG. 3E illustrates an example hybrid honeycomb-web structure in which web structures are formed in a honeycomb pattern. The honeycomb pattern may be uniform, or as illustrated in FIG. 3E, may vary in size, shape, and/or web cross section. In one example, the hybrid honeycomb-web structure may be created or obtained through operation of the physics engine 140 (FIG. 1) or other portion of the system 100.

FIG. 3F illustrates an example packing structure comprising multiple loose or fibrous particles, similar to packing peanuts or silly string. The loose or fibrous particles may comprise any desired shape and/or size. In some examples, the particles may be configured to interlock, frictionally engage, and/or entangle with one another. In other examples, individual particles may be sized and/or shaped to provide resilience, vibration damping, impact absorption, or the like.

Another example support structure includes a bubble or air pocket structure in which a relatively thin membrane of material is printed to form bubbles or air pockets. The bubbles or air pockets may be uniform in size, shape, and/or wall thickness or may vary in size, shape, and/or wall thickness. In some examples, the bubbles or air pockets may be individually sealed, while in other examples, some or all of the bubbles or air pockets may be in communication with one or more other of the bubbles or air pockets via one or more air passages. In the latter case, the air passages may be sized to restrict passage of air, thus providing a damping effect to damp vibration and/or absorb impact. The size of the air passages may be uniform throughout, or may be varied to restrict airflow more in some areas than others.

Yet another example support structure includes a sponge-like structure having a plurality of voids or pores. The voids or pores may be uniform in size and/or shape, or may be variable. Moreover, the voids may be evenly spaced throughout the sponge structure, or may be non-uniformly spaced throughout the sponge structure.

Any of the foregoing structures may be modified and/or combined with each other or other structures to produce packages according to this disclosure. By way of example and not limitation, the honeycomb structure of FIG. 3A may be modified to include gussets or corner rounding between adjacent chambers of the honeycomb to further increase a structural integrity and minimize stress risers in the structure.

FIGS. 4A and 4B illustrate an example packaged item 400 comprising a package 402 encapsulating an item 404. In the illustrated example, the item is shown as a cup or mug for ease of explanation. However, in other examples, the item may be any item that is to be packaged (e.g., for storage or shipping). In FIG. 4A, the item 404 is shown in broken lines inside the package 402. FIG. 4B is a cross sectional view of the packaged item 400 taken along line B-B in FIG. 4A. As shown in FIG. 4B, the package 402 may include a shell 406 covering an exterior of the package 402, and multiple regions of packing material 408, 410, 412, and 414. Each of the different regions 408, 410, 412, and 414 of packing material may have a different structure, a different density, and/or be made of a different material. The structure and/or material of the different regions of packing material may be chosen based on characteristics (e.g., size, density, durability, strength, material of construction, etc.) of different regions or parts (e.g., interior, exterior, top, bottom, void, protrusion, etc.) of the item to be shipped. Further, the structure and/or material of the different regions of packing material may be chosen based on one or more constraints (e.g., weight of the package, total weight of the packaged item, expected orientation of travel, size of the overall package or one or more dimensions, etc.).

For instance, in the illustrated example, the bottom packing material 408 and the top packing material 410 may comprise a flexible or deformable material and may have a bubble or sponge structure configured to dampen vibration and/or absorb impacts applied to the packaged item 400. In the illustrated example, the bottom packing material 408 and the top packing material 410 are two separate pieces of material that may be pulled apart to access the item 404 once the shell 406 is removed. The bottom packing material 408 and the top packing material 410 may be made of the same or different materials. The packing material 412 disposed around the handle of the mug is an example of packing material that may be used to protect fragile regions of the item 404. In this example, the packing material 412 may comprise a relatively hard material having a relatively rigid structure (e.g., lattice, truss, or rib structures) that supports and protects the fragile portion (the handle in this example) of the item. In some examples, the packing material 412 may comprise multiple parts that fit together around the fragile part and are separable to remove the packing material 412 once the package 402 is opened. The packing material 414 within a cavity of the item (the reservoir of the mug in this example) may be made of yet another material and/or structure designed to provide a relatively rigid supporting structure (e.g., honeycomb) to prevent the item from being crushed when exposed to outside forces.

The package 402 may also include one or more printed opening mechanisms to facilitate opening the package. In this example, the opening mechanism includes a tear strip 416 disposed around at least a portion of a perimeter of the package 402 outside the packing material 408, 410, 412, and 414, but within the shell 406. The tear strip 416 may be made of a material having strength greater than a material of the shell 406. Additionally or alternatively, the shell 406 may include a frangible feature or other region aligned with the tear strip 416 to facilitate tearing or breaking of the shell 406 along the frangible seam or region. The frangible feature may comprise, for example, one or more perforations, thinned or weakened areas, and/or notches or grooves. In the illustrated example, the tear strip 416 protrudes through the shell 406 and includes a pull tab 418 or other graspable member. In such an example, a user may grasp the pull tab 418 and pull the tear strip 416 to tear or otherwise break the shell 406. Once the shell 406 is broken, it may be removed and the user may pull apart the top and bottom packing materials 408 and 410 to expose the item 404. The packing materials 412 and 414 may then be removed from the item.

In other examples, the tear strip 416 may not protrude from the shell 406. In that case, the package may include a visual indicator of how the package is to be opened. For instance, the package may have a dashed line printed on an exterior of the package where the tear strip is located, a picture showing a person opening the package, and/or textual instructions for how to open the package.

Additionally, in some embodiments, the opening mechanism may comprise a child resistant opening mechanism that is readily operable by an adult, but is difficult or impossible to open by a child. In one example, a child resistant opening mechanism may be implemented using the tear strip shown in FIG. 4B by making the tearing force required to pull the tab 418 at or above a threshold force requiring more strength to open than a typical child possesses. The tearing force may be set at or above the threshold by, for example, selecting a thickness and/or material of the shell to provide the threshold force.

Example Packaging Process

Figure 5:
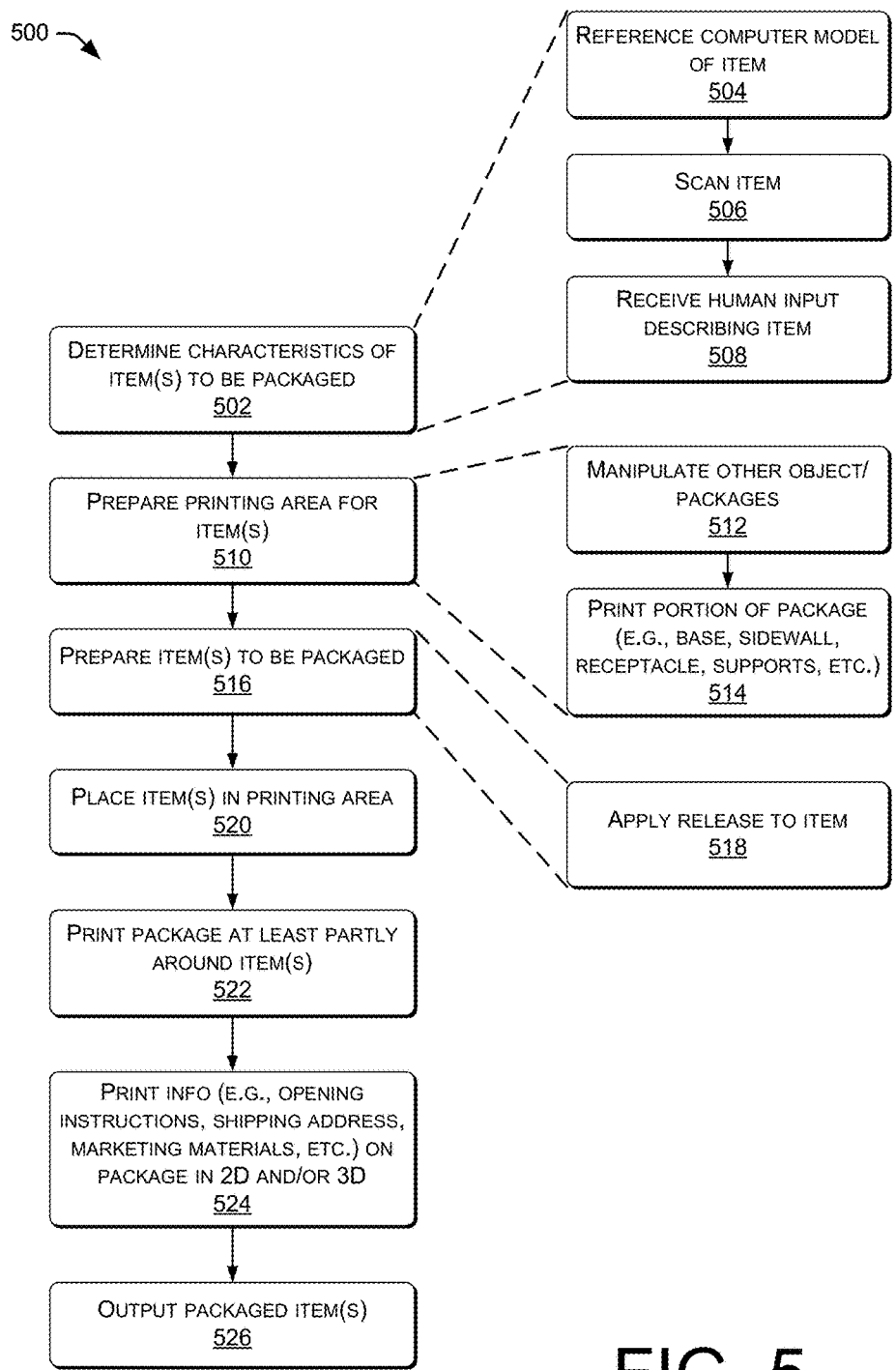
FIG. 5 is a flowchart illustrating an example process of packaging and item using 3-D printing.

FIG. 5 is a flowchart showing an example process 500 of packaging an item in whole or in part using 3-D printing or additive manufacturing. The process 500 may, but need not necessarily, be implemented in whole or in part by the system 100. The process 500 is described with reference to the system 100 for ease of understanding, but is not limited to being performed with the system 100. Accordingly, the system 100 is capable of performing numerous other processes and the process 500 may be implemented using numerous other systems.

The process 500 is illustrated as collections of blocks and/or arrows in logical flowcharts representing a sequence of operations that can be implemented in hardware, software, firmware, or a combination thereof. The order in which the blocks are described is not intended to be construed as a limitation, and any number of the described operations can be combined in any order to implement the process, or alternate processes. Additionally, individual operations may be omitted from the process without departing from the spirit and scope of the subject matter described herein. In the context of software, the blocks represent computer instructions that, when executed by one or more processors, perform the recited operations. Such instructions may be resident in memory (e.g., memory 118 of FIG. 1). In the context of hardware, the blocks may represent one or more circuits (e.g., ASICs, FPGAs, specialized processors, or the like) configured to execute the recited operations.

The example process 500 includes, at block 502, determining one or more characteristics of one or more items to be packaged. The characteristics may include any measurable or observable property of the item such as, for example, geometry (internal and/or external), size, shape, materials, weight, volume, density, color, hardness, strength, surface finish, temperature, chemical composition, or the like. The characteristic(s) of the item may be determined in a variety of ways. By way of example and not limitation, characteristics of each item may be determined by referencing a computer model for the item (block 504), scanning the item (block 506), and/or receiving human input describing the item (block 508). Any or all of these operations, or other operations, may be used to determine characteristics of the item(s) to be packaged.

At block 504, characteristics of the item may be determined by referencing a computer model of the item (if available) or other information about the item. For example, a computing device, such as computing device 102, may refer to a computer model of the item, such as item model 130. The item model maybe stored locally at the computing device, or stored remotely and accessible by the computing device via a network (e.g., a local or wide area network). In some examples a user may specifically provide or identify the item model that the computing device is to reference for a given item (e.g., by uploading, selecting, or otherwise identifying the item model). In other examples, the computing device may automatically identify an item model corresponding to the item in response to recognizing the item. In various examples, the computing device may recognize the item by one or more of optical recognition of the item (e.g., by comparison of an image of the item with a catalog or potential items, such as items in an inventory), scanning an item identifier (e.g., bar code, quick response code, radio frequency identification tag, etc.), or the like. In some instances, the item model may include only dimensional information of the item, while in other instances the item model may include information about materials, manufacturing techniques, surface finishes, and other information about the item.

At block 506, characteristics of the item may be determined by scanning the item. For example, a computing device, such as computing device 102, may obtain scan information from a scanner, such as scanner 106. In some examples, the computing device may control the scanner or otherwise cause the scanner to scan each item, while in other examples, the scanner may scan each item independently of the computing device and may make the scan information available to the computing device (e.g., by storing the scan information in a model store such as model store 128, by pushing the scan information to the computing device, or by allowing the computing device to query the scanner to obtain the computing device). As noted above, the scanner 106 may comprise a 3-D optical scanner, a 3-D laser scanner, one or more cameras to determine outer dimensions of the item, an ultrasound scanner, an x-ray scanner, a spectrometer, a scale, and/or other scanning or sensing equipment to determine interior characteristics of the item, materials from which the item is made, weight of the item, volume of the item, density of the item, and the like. These scanned characteristics of the item may be obtained and/or used in addition to or instead of characteristics determined from the item model (if available). For instance, in some examples, the scanned characteristics may be used to supplement an item model (e.g., to provide material information, weight, density, or the like to supplement an item model that only includes geometric information of the item). Further, as noted above, some scanned characteristics may be used to recognize the item in order to identify an item model corresponding to the item. In still further examples, the scanned characteristics may be used to generate an item model for an item for which an item model was not previously available.

At block 508, human input may be used to determine characteristics of the item. The human input may be preexisting information (e.g., product specifications, item descriptions, brochures, websites, etc.) describing the item. Additionally or alternatively, the human input may be generated substantially at the time the item is to be packaged (e.g., by an operator of the computing device, scanner, or 3-D printer inputting a description of one or more characteristics of the item). In yet another example, human input may be obtained from one or more remote human users by, for example searching for customer reviews of the item (e.g., on one or more merchant web sites or the internet), requesting human users to describe the item (e.g., requesting information about the item via a mechanical Turk service), or the like.

The method 500 may further include, at block 510, preparing a printing area for the item(s). Preparing the printing area may include cleaning the printing area following a previous printing operation, manipulating one or more other objects (e.g., items or packages) in the printing area (block 512), and/or printing a portion of a package to receive the item (block 514). In some instances, manipulating the one or more other objects, at block 512, may simply comprise removing a package from a previous printing operation. In other instances, multiple items may be sequentially packaged in the printing area. In that case, manipulating one or more other objects at block 512 may comprise placing a pallet, tray, or other support surface into the printing area, rearranging or reorienting a support surface previously placed in the printing area, and/or moving or reorienting one or more packaged items in the printing area. In one specific example, multiple items may be sequentially packaged in situ on a pallet or other support surface. Once the support surface is fully loaded, the support surface may be removed from the printing area along with the multiple packaged items supported thereon.

As noted, in some examples, preparing the printing area may comprise, at block 514, printing a portion of a package for the item. The portion of the package printed may depend on the nature of the item to be packaged and may include, for example, a base, sidewall, receptacle, one or more supports, or the like. In one simple example, a base or bottom of a package may be printed in the printing area on which the item may be placed. For instance, referring to the example of FIG. 4B above, a bottom portion of the shell 406 and packing material 408 may be printed in the printing area as part of preparing the printing area to receive the item 404.

Additionally or alternatively, the method 500 may include, at block 516, preparing the item to be packaged. In some instances the item may not require any special preparation prior to printing. However, in other examples, at block 518 a release may be applied to the item to prevent the packaging material from adhering to or damaging the item. In one example, a computing device such as the computing device 102 may instruct a tool such as item manipulator 108 to apply the release to the item, while in other examples the release may be applied to the item by another device or process prior to or after being placed in the printing area. In some examples, the release may comprise a chemical or material (e.g., corn starch, wax, paper, metal foil, etc.) applied to item to prevent the 3-D printed packaging material from adhering or bonding to the item. In other examples, the release may comprise a property imparted to the item (e.g., an electrostatic charge, a polished surface finish, a cold temperature, electromagnetic radiation, etc.) that helps to prevent the 3-D printed packaging material from adhering or bonding to the item. In still other examples, the release may be omitted (e.g., if the 3-D printed packaging material does not adhere to the material of the item, if a gap is maintained between the item and the 3-D printed packaging material during printing, and/or if it is desired that the 3-D printed packaging material adhere or bond to the item). As noted above, the release may be applied before, during, or (in the case where part of the package is printed before the item is placed in the printing area) after the printing process commences.

While the foregoing examples describe operations to facilitate the packaging process, the item may additionally or alternatively be subjected to one or more other operations in preparation to be packaged. For instance, the item may be sanitized (e.g., by chemical sanitizer, steam, irradiation, or other sanitation mechanisms), be subjected to a preserving process, coated with a moisture barrier, or any number of other processes depending on the item to be packaged.

At block 520, the item maybe placed and/or supported in the printing area and, at block 522, printing of the package around the item(s) may commence or continue (in the case where the package was partially printed prior to the item being placed in the printing area). In some examples, the item(s) or partially printed package may be manipulated during the printing process. For instance, in one simple example, an item may be placed in the printing area, a top portion of a package may be printed around the item, the package may then be rotated 180 degrees to expose the bottom of the item, and the bottom portion of the package (now oriented on the top) may then be printed. In other examples, the item may remain stationary during the printing process and one or more print heads of the 3-D printer may move around the item. In that case, one or more surfaces or members supporting the item may move to maintain support of the item while accommodating movement of the print head(s) of the 3-D printer. As noted above, in some examples, the printing process may include printing one or more packages around one or more items simultaneously and/or sequentially.

Once one or more packages have been printed, at block 524, information may be printed on the package in 2-D or 3-D. The information may be printed on the package(s) by the same 3-D print head(s) used to print the package(s) or by a separate 2-D printer located in or proximate the printing area. A wide range of information may be printed on the package(s). By way of example and not limitation, information that may be printed on the package(s) includes shipping information (e.g., sender and/or recipient address), packing list of the item(s) in the package, shipping instructions (e.g., "fragile", "this end up," etc.), opening instructions, description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3-D relief code, or the like), a date on which the package was printed, a location at which the package was printed, an entity that printed the package, an identifier of the printer that printed the package, marketing or advertising information, an aesthetic design or image (e.g., printed on wrapping paper), or any other pertinent information.

At block 526, the package(s) may be output. As noted above, outputting the package may comprise outputting a single package containing one or more items or outputting multiple packages (e.g., on a pallet or other support surface) each containing one or more items. In one example, a computing device such as computing device 102 may instruct a tool such as manipulator 108 to remove the packaged item(s) from the print area. In other examples, the packaged items may be output from the printing area by one or more other systems in coordination with or independent of the computing device.

Multiple Package Examples

As discussed above, in some examples, multiple items may be packaged concurrently or sequentially. In the case where the items are to be packaged in multiple packages, the size, shape, and configuration of one or more of the packages may be based at least in part on the size, shape, and configuration of others of the multiple packages. For instance, if multiple packages are to be placed on a pallet or other support surface, the size, shape, and/or configuration of some or all of the packages may be chosen at least in part to result in a uniform, well-packed unit of packages. A uniform, well-packed unit of packages is one that is stable (i.e., won't topple over) and is substantially free of voids, gaps, and open spaces between packages. However, uniform, well-packed unit of packages need not be completely free of voids, gaps, and open spaces. For instance, a uniform, well-packed unit of packages may include voids, gaps, and open spaces to provide clearance to fit hands or package handling tools between packages, to provide clearance for assembly or disassembly of packages to/from the unit of packages, to allow for expansion or contraction of the packages, or the like. In some examples, a uniform, well-packed unit of packages may be substantially cube shaped or rectangular prism shaped. However, in other examples, a uniform, well-packed unit of packages may take on other shapes. FIGS. 6A-6D are top or cross-sectional views of examples of uniform, well-packed units of packages.

In some examples, all of the packages making up the unit of packages may be configured based at least in part the other packages in the unit of packages. In other examples, a limited number of the packages (e.g., a single package, corner packages, a row of packages, etc.) in the unit of packages may be configured based in part on a remaining space on a pallet or other support surface. In that case, size and shape of the limited number of packages may be modified (relative to the otherwise optimal size and shape for the package) to fill a remaining space on a pallet or other support surface (or a row of stacked packages) to result in a uniform, well packed unit of packages. In either of the foregoing examples, the computing device 102 may take into account the size and shape of multiple packages in a queue of packages to be printed when creating new package models. Furthermore, as new packages are added to the queue, the computing device 102 may modify or adjust the size and shape of one or more other packages in the queue in order to create a uniform, well-packed unit of packages.

Figures 6A, 6B:
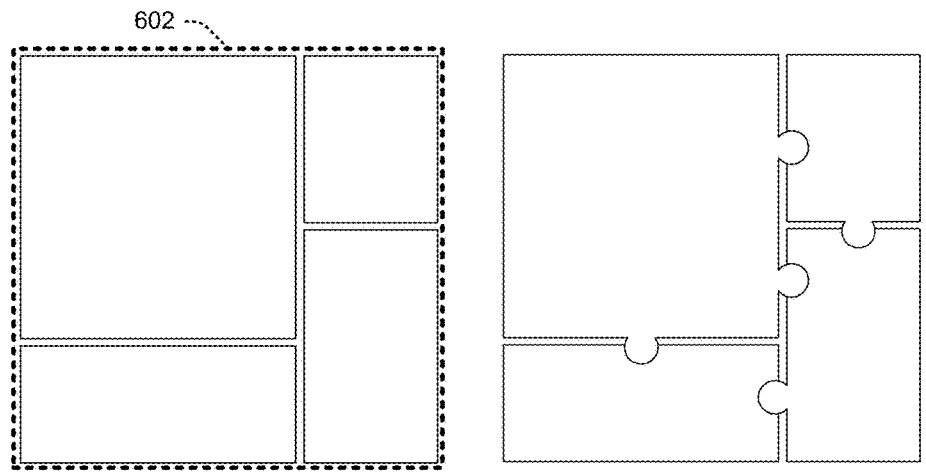
FIGS. 6A-6D illustrate examples of arranging multiple 3D printed packages.
Figures 6C, 6D:
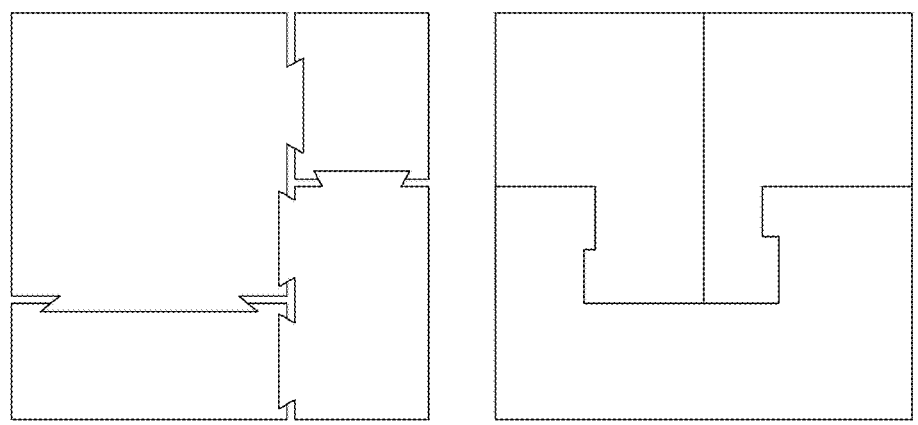

In some examples, such as those shown in FIGS. 6B-6D, the packages making up the unit of packages may include one or more interlocking features configured to interlock with adjacent packages on the top, bottom, and/or sides to hold the unit of packages together. Examples of interlocking features include, without limitation, protrusions, grooves, puzzle pieces, channels, ridges, notches, or the like. FIG. 6B illustrates an example in which some packages have bulbous protrusions that slide into complimentary grooves in adjacent packages to lock the packages together. FIG. 6C illustrates an example in which some packages include outwardly beveled protrusions (e.g., male dovetails) that fit into complimentary beveled channels (e.g., female dovetails) in adjacent packages to lock the packages together. In other examples, such as the example shown in FIG. 6D, the packages themselves may be configured as puzzle pieces that lock together with one or more other packages. Additionally or alternatively, one or more straps, bands, wraps, supports, or other structures may be printed around at least a portion of the unit of packages to secure the unit of packages together and/or to the pallet or support surface. FIG. 6A illustrates a band or strap 602 surrounding a unit of packages. Similar bands or straps may also be provided around the circumference of the unit of packages in other dimensions (e.g., when viewed from the front and/or side). In some examples, multiple bands or straps may be used in each dimension (e.g., one band or strap around each row and/or column of packages). In some examples, such bands or straps may be applied using conventional strapping techniques. However, in other examples, the bands and/or straps may be printed directly around the unit of packages during or after a process of printing the packages making up the unit of packages. The bands or straps may be made of plastic, metal, paper, and/or any other material suitable and/or conventionally used for strapping purposes.

By taking into account characteristics of other items to be packaged, a computing device such as computing device 102, may ensure that not only is each item well packaged, but also that the packages will fit together with the other items to create a unit of packages that can easily be transported and/or stored together. Additionally, the packages may be added to a pallet or other transport structure in an order that protects more fragile and/or expensive items (e.g., fragile and/or expensive items may be placed at or near a top of a stack of packages). In one specific example, multiple items all destined for a same destination (e.g., city, transfer station, warehouse, etc.) may all be packaged concurrently or sequentially) and placed on a pallet or other support surface for transfer to the destination.

Alternatively, the packages making up the unit of packages may be independently packaged (i.e., not taking into account the other packages in the unit of packages and/or without knowledge of what unit of packages the package will be a part of). In that case, a computing device, such as computing device 102, may determine, for a plurality of packages, how to stack and arrange them on one or more pallets or other support surfaces to provide the most uniform, well packed unit(s) of packages possible. In some examples, the computing device may further print one or more spacers or empty packages to fill gaps or voids in the unit of packages to improve a stability and/or uniformity of the unit of packages. In some examples, the computing device may direct an item manipulator, such as item manipulator 108, to stack the packages as the computing device directs. However, in other examples, the item manipulator may be programmed to stack the packages independently of the computing device. In some instances, the item manipulator may use touch sensors on the item manipulator to determine the size and shape of the packages and to place them accordingly. In other examples, the item manipulator may use input from a scanner, such as scanner 106, or one or more other cameras or sensors to determine the size and shape of the packages and to place them accordingly.

In yet another example, multiple items may be packaged in multiple regions or compartments of a single package.

Each region or compartment may include a single item or multiple items designed for a same destination. The package may include one or more separation features to allow separation of each of the multiple compartments or regions from the rest of the package. By way of example and not limitation, each of the regions or compartments may be coupled to the package by a skin or one or more thin strips of material, and one or more tear strips may be provided between the regions or compartments to separate the regions or compartments. Each region or compartment may be separated from the rest of the package by pulling on or otherwise breaking respective tear strips to separate the respective region or compartment into a separate package. In some examples, pulling a single tear strip may separate multiple regions or compartments (e.g., a whole row or column of packages) from the package. Examples of other separation features include perforations, notches, thinned or weakened sections, or the like.

Example Packaging Station

In one example, a 3-D printing system such as that shown in FIG. 1 may be implemented as a packaging station. Such a station may be located in a bricks and mortar store, such as a retail store or shipping store (e.g., FedEx Kinkos, UPS Store, etc.), a governmental building (e.g., a post office), an airport, an indoor or outdoor kiosk, a storage facility, or at any other suitable location where items are to be packaged for shipping or storage. In this example, the system may include a user terminal including a display and one or more input devices (e.g., a microphone, touch screen, mouse, keyboard, etc.). The user may identify one or more items to be packaged by, for example, placing the item(s) in the printing area or another area proximate and/or associated with the 3-D printing system, selecting the items from a catalog or menu of items, notifying a clerk or operator of the items, or the like. In another example, the user may have previously identified the item(s) from a remote terminal (e.g., a personal computer, mobile device, or the like).

Additionally, in some examples, the user may be prompted or otherwise allowed to input additional information, such as a purpose of the packaging (e.g., storage, shipping, etc.), a sender address, a recipient address, a shipping mode and/or speed (e.g., UPS ground, FedEx overnight, etc.), any special handling instructions (e.g., fragile, hazardous materials, etc.), a cost of the item(s), an exterior decoration or "wrapping," and/or one or more package features (e.g., thermal insulation, vibration damping, hermetically sealed, child safe, tamper evident, etc.). In other examples, the packing station may automatically determine or infer any or all of these types of additional information. Additionally, in some examples, the 3-D printing system may display a price for packaging and/or shipping the item, and provide an interface by which the user can pay for the packaging, storage, and/or shipping.

Regardless of how the items are identified to the 3-D printing system, the item(s) may be packaged according to the method of FIG. 5 or any other processes described herein. In some implementations, the packaged item(s) may be automatically placed into storage and/or shipped without any further input from the user. For instance, the packages may be placed in a post-printing staging area for pickup by a common carrier (e.g., USPS, UPS, FedEx, or the like), transported to a carrier for shipping, and/or loaded onto a vehicle (e.g., truck, airplane, ship, drone, etc.) for shipping. Alternatively, the packages may be placed in an output area for pickup and storage and/or shipping by the user. In various examples, the item(s) may be purchased prior to, as part of, or after the 3-D packaging process. In one specific example, the user may go to a store, select one or more items they want to purchase, provide the item(s) to the 3-D packaging system, and have the item packaged and/or shipped.

Ecommerce Merchant Example

In another example, a 3-D printing system including some or all of the components and/or techniques shown and described herein, with or without other components, may be implemented by an ecommerce merchant. Such a system may be located in a warehouse or fulfillment center of the ecommerce merchant and may utilize any or all of the structures, techniques, and systems described herein. When a user places an order for one or more items, the one or more items may be provided to the 3-D printing system. In some examples, the items may be retrieved by an employee, robot, conveyor, and/or other inventory management systems or tools of the ecommerce merchant and placed in the printing area or another proximate or associated area (e.g., a staging area, a bin of items to be packaged, or the like). In other examples, the items may be retrieved automatically by and/or under the control of one or more automated systems (e.g., robots, conveyors, machines, computer systems, etc.) and made available to the 3-D printing system. In some examples, the 3-D printing system may be communicatively coupled to the one or more automated systems.

In this example, once the user purchases one or more items from the ecommerce merchant, the item(s) may be automatically packaged and/or shipped according to the method of FIG. 5 or any other processes described herein.

Example 3-D Printed Packaging for Medication

While the examples above are generally applicable to packaging of any items, the following example describes details suitable for packaging pharmaceutical compositions, medications, vitamins, supplements, and the like. This example may employ a 3-D printing system and/or techniques such as that shown and described herein. In this example, however, the system may be located in a sterile environment.

In some examples, one or more pills, capsules, gelcaps, or other medicinal product may be packaged in a 3-D printed package according to according to the method of FIG. 5 or any other processes described herein. In such an example, the operation of preparing the printing area may comprise sterilizing the printing area. Further, the 3-D printed package in such an example may include one or more tamper evident features and/or child safety features, such as those described above. In some examples, the container may be formed and the medicinal product may be counted and placed in the container. In other examples, the medicinal product may be placed in the printing are and the container may be formed around the medicinal product. Such an arrangement may allow for a wide variety of new and previously unattainable packaging solutions. In some examples, the container may comprise a bottle, pouch, or other package into which individual pills, capsules, gelcaps, or other doses of the medicinal product are placed. In that case, the container may be made of a conventional plastic, metal, ceramic, or other material commonly used to house medicinal products.

In other examples, the 3-D printed container may comprise an ingestible capsule to hold a medicinal product in powder, liquid, solid, or gel form.

In still other examples, the medicinal product itself may be printed by the 3-D printing system. For instance, a print media of the 3-D printing system may comprise a pharmaceutical composition. In that case, the 3-D printer used in the system may be a food or pharmaceutical or food grade 3-D printer configured to print using pharmaceutical and/or food grade print media, such as compositions including, for example, one or more active ingredients with or without one or more fillers (e.g., lactose, cellulose, corn starch, sugars, whey, yeast, etc.) and/or one or more binders (e.g., povidone, xanthan gum, carbopol, glycerine, polylactic acid, etc.), or the like. Individual pills, capsules, gelcaps, or other doses (collectively referred to as "pills") of medicinal product may be formed (e.g., printed) in any desired shape and size, customized for a particular user's dose, and/or may be printed directly into a container. The container itself may additionally or alternatively have been printed using the same or different 3-D printing system. Formulation of print media may be varied during print process to adjust concentration of active and/or inactive ingredient in different pills and/or in different parts of a single pill (e.g., high concentration in exterior of pill for quick acting with lower concentration in interior of pill for long lasting). Print media may additionally or alternatively be varied to change the density and/or solubility of different portions of the pill (e.g., lower density and/or higher solubility of a first portion to promote quick release of active ingredient, with higher density and/or lower solubility of a second portion to promote delayed release). Additionally or alternatively, the formulation of the print media may be varied to use different active and/or inactive ingredients in different pills and/or different portions of a single pill (e.g., different active ingredients in different portions of the pill). Color of the print media may also be varied in accordance with variations in formulation in order to visually indicate the changes in formulation. These variances in print media may be designed as multiple (e.g., 2, 3, 4, . . . n) discrete portions, or the variances may be continuously variable (e.g., the concentration, density, and/or solubility of the print media may gradually increase from a minimum to a maximum).

The foregoing examples may be used to produce and/or package medication as-needed or on-demand. As such, the examples may find use in a staffed or self service pharmacy, hospital, doctor's office, grocery store, in a patient's home, or the like. Moreover, the examples may be applicable to bricks and mortar locations as well as online or mail order providers.

What is claimed is:

1. A method of packaging multiple items, the method comprising:
   printing, using a three dimensional (3-D) printer, a 3-D printed package including multiple compartments, at least one item of the multiple items being disposed in each compartment; and
   printing, using the 3-D printer, one or more separation features into the 3-D printed package to allow separation of each of the multiple compartments from a remainder of the package.

2. The method of claim 1, wherein the printing the one or more separation features into the 3-D package comprises printing a skin of material and one or more tear strips between the multiple compartments to separate the multiple compartments, wherein each compartment of the multiple compartments is separable from the remainder of the package by pulling on a respective tear strip to separate the respective compartment into a separate package.

3. The method of claim 1, wherein the printing the one or more separation features into the 3-D package comprises printing a single tear strip separating a first region of compartments from a second region of compartments, such that the first region of compartments is separable from the second region of compartments by pulling the tear strip.

4. The method of claim 1, wherein the one or more separation features comprise at least one of:
   one or more tear strips;
   one or more perforations;
   one or more notches;
   one or more thinned sections of the 3-D printed package;
   one or more weakened sections of the 3-D printed package.

5. The method of claim 1, wherein each compartment includes a single item or multiple items designated for a same destination.

6. The method of claim 1, wherein the printing the 3-D printed package comprises printing the 3-D printed package around the multiple items.

7. The method of claim 1, wherein the multiple items are inserted into the multiple compartments after the 3-D printed package is at least partially printed.

8. The method of claim 1, wherein the printing the 3-D printed package comprises:
   printing packing material at least partially around the multiple items; and
   printing an outer cover about at least a portion of an exterior of the packing material.

9. A method of packaging multiple items using one or more three dimensional (3-D) printers, the method comprising:
   determining a size and/or shape of a particular 3-D printed package to be printed for an item based at least in part on a size and/or shape of one or more other packages of multiple packages to be 3-D printed; and
   printing the particular 3-D printed package having the determined size and/or shape.

10. The method of claim 9, wherein:
    the multiple packages are to be placed on a pallet or other support surface; and
    the size and/or shape of the particular 3-D printed package is chosen at least in part to result in a uniform, well-packed unit of packages on the pallet or other support structure.

11. The method of claim 10, wherein the uniform, well-packed unit of packages is substantially free of voids, gaps, and open spaces between packages.

12. The method of claim 10, wherein the uniform, well-packed unit of packages includes one or more voids, gaps, and/or open spaces between the multiple packages.

13. The method of claim 10, wherein the uniform, well-packed unit of packages is substantially cube shaped or rectangular prism shaped.

14. The method of claim 9, further comprising:
    adding a new package to a queue of packages to be 3-D printed; and
    modifying or adjusting a size and/or shape of one or more other packages in the queue of packages to be 3-D printed in order to create a uniform, well-packed unit of packages.

15. The method of claim 9, further comprising:
    printing a remainder of the multiple packages; and
    printing one or more bands and/or straps directly around the multiple packages.

16. The method of claim 9, further comprising:
    printing a remainder of the multiple packages; and
    printing one or more spacers or empty packages to fill gaps or voids between the multiple packages to form a uniform unit of packages.

17. The method of claim 9, wherein printing the particular 3-D printed package further comprises printing one or more interlocking features configured to interlock with one or more other packages of the multiple packages to form a unit of packages.

18. A method of packaging multiple items using one or more three dimensional (3-D) printers, the method comprising:
   determining a size, shape, and/or configuration for a particular 3-D printed package to be printed for an item based at least in part on size, shape, and/or configuration of one or more other packages of multiple packages; and
   printing the particular 3-D printed package having one or more interlocking features configured to interlock with one or more other packages of the multiple packages.

19. The method of claim 18, wherein:
   the multiple packages are to be placed on a pallet or other support surface; and
   the size and/or shape of the particular 3-D printed package is chosen at least in part to result in a uniform, well-packed unit of packages on the pallet or other support structure.

20. The method of claim 18, further comprising:
   printing a remainder of the multiple packages; and
   printing one or more spacers or empty packages to fill gaps or voids between the multiple packages to form a uniform unit of packages.

* * * * *